(12) United States Patent
Zanotti

(10) Patent No.: US 10,224,768 B2
(45) Date of Patent: Mar. 5, 2019

(54) MAGNETIC DRIVE DEVICE

(71) Applicant: Gianfausto Zanotti, Brescia (IT)

(72) Inventor: Gianfausto Zanotti, Brescia (IT)

( * ) Notice: Subject to any disclaimer, the term of this patent is extended or adjusted under 35 U.S.C. 154(b) by 894 days.

(21) Appl. No.: 14/762,520

(22) PCT Filed: Jan. 23, 2014

(86) PCT No.: PCT/IB2014/058488
§ 371 (c)(1),
(2) Date: Jul. 22, 2015

(87) PCT Pub. No.: WO2014/115096
PCT Pub. Date: Jul. 31, 2014

(65) Prior Publication Data
US 2015/0364958 A1  Dec. 17, 2015

(30) Foreign Application Priority Data
Jan. 23, 2013 (IT) .............................. MI2013A0088

(51) Int. Cl.
*H02K 1/27* (2006.01)
*B66B 9/08* (2006.01)
*B66B 11/04* (2006.01)

(52) U.S. Cl.
CPC .............. *H02K 1/27* (2013.01); *B66B 9/08* (2013.01); *B66B 9/0807* (2013.01); *B66B 11/0407* (2013.01)

(58) Field of Classification Search
CPC .......... H02K 1/27; H02K 21/12; H02K 41/00; H02K 33/00; H02K 7/10; H02K 16/00; H02K 41/02; H02K 16/04; H02K 21/44; H02K 2201/15; H02K 2213/12; H02K 2213/03; H02K 7/1838; Y02E 10/721

USPC .......................... 310/112, 12.01, 156.35, 268
See application file for complete search history.

(56) References Cited

U.S. PATENT DOCUMENTS

| 3,771,462 | A |   | 11/1973 | Barthalon et al. |
| 5,959,374 | A | * | 9/1999 | Anderson ............ H02K 41/031 310/13 |
| 7,442,022 | B2 | * | 10/2008 | Konno .................... B29C 45/66 425/150 |

(Continued)

FOREIGN PATENT DOCUMENTS

| CN | 102447365 A | 5/2012 |
| EP | 1382558 A1 | 1/2004 |

(Continued)

OTHER PUBLICATIONS

International Search Report for PCT/IB2014/058488 dated Sep. 26, 2014.

*Primary Examiner* — Thomas Truong
*Assistant Examiner* — Leda T Pham
(74) *Attorney, Agent, or Firm* — Arent Fox LLP; Michael Fainberg

(57) ABSTRACT

Magnetic drive device characterized in that it comprises a driving element moving in a guide element, and suitable to drive a driven element; the driven element is mobile along the guide element, in accordance with the movement of the driving element; the driving element acting on the driven element by use of magnetic means and without direct physical contact. The magnetic drive action of the driving element is induced by means of the use of permanent magnets or of electromagnets which act on the driven element.

20 Claims, 12 Drawing Sheets

(56) References Cited

U.S. PATENT DOCUMENTS 8,237,321 B2 * 8/2012 Hoppe ................. H02K 41/033
    310/112
2009/0278358 A1 * 11/2009 Lemieux ................. F03B 13/20
    290/53

FOREIGN PATENT DOCUMENTS

| EP | 1607205 A1 | 12/2005 |
| WO | 2008136692 A2 | 11/2008 |

* cited by examiner

MAGNETIC DRIVE DEVICE

CROSS-REFERENCE TO RELATED APPLICATION

This application is a National Stage entry of International Application No. PCT/IB2014/058488, filed Jan. 23, 2014, which claims priority to Italian Patent Application No. MI2013A000088, filed Jan. 23, 2013. The disclosures of the priority applications are incorporated in their entirety herein by reference.

The present invention relates to a magnetic drive device.

It is known of to use electromagnetic forces to realise drive or traction systems.

Electromagnetic forces are for example used in magnetic levitation or "maglev" trains.

One widespread use of electromagnetic forces is that of magnetic drive pumps.

In a magnetic drive pump, typically a magnet connected to the drive shaft transfers its moment to the magnet of the rotor. The rotor rotates in its shaft inside the separator body without any contact between the drive shaft and the rotor. No sealing body is provided on the shaft which could damage itself and cause leaking.

The task of the present invention is to make a magnetic drive device which has broader applications and above all which can be used to move objects along long and complex paths.

Within the scope of this task, one object of the invention is to make a magnetic drive device which has applications in various sectors, in the mechanical, chemical field, in the production of electricity and others, where objects, materials and people need to be moved without direct contact between the driving device and driven object.

Another object of the invention is to make a device which is aesthetically attractive and lightweight.

Another object of the present invention is to make a device which, as a result of its specific production characteristics, is able to provide the best guarantees of reliability and safety of use.

A further object of the present invention is to provide a structure which is easy to make using elements and materials commonly available for sale and which is, in addition, competitive in economic terms.

These and other objects, described further below, are achieved by a magnetic drive device characterised in that it comprises a driving element moving in a guide element, and suitable to drive a driven element; said driven element being mobile along said guide element, in accordance with the movement of said driving element; said driving element acting on said driven element by use of magnetic means and without direct physical contact.

Further characteristics and advantages will be more clearly comprehensible from the description of preferred but non-limiting embodiments, of the invention, illustrated by way of a non-limiting example in the appended drawings, wherein.

Figure 1:
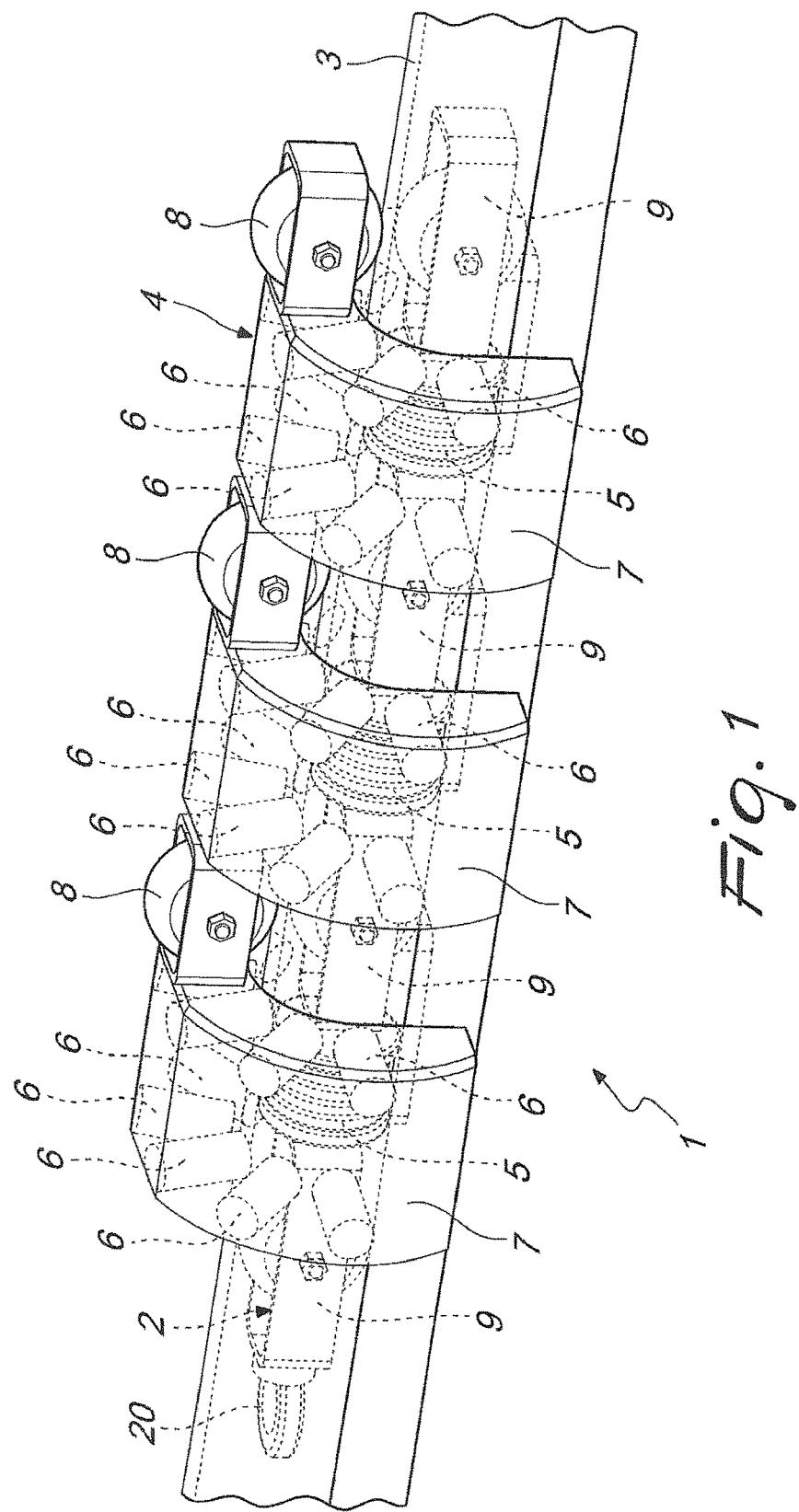
FIG. 1 is a perspective view of an example of a magnetic drive device, according to the present invention.

With reference to the drawings mentioned, the device according to the invention, globally denoted by reference numeral 1, comprises a driving element 2 moving in a guide element 3 and suitable to drive a driven element 4, which is mobile along said guide 3 in accordance with the driving element 2.

The driving element 2 acts on the driven element 4 by use of magnetic means.

The magnetic means are composed of a series of permanent or electromagnetic magnets.

In the example shown in FIGS. 1-5, illustrated here merely by way of example, the magnetic drive device 1, according to the present invention, is used in the stair lift sector, and in particular for an appliance for the movement of a chair, of the type commonly known as a chair-lift.

The stair lift appliance, globally denoted by reference numeral 10, comprises a chair 11 attached to a mobile support 12 in turn associated to the driven element 4 of the drive device 1.

In this embodiment, the guide element 3 of the drive device 1, is composed of a tubular element which the driving element 2 slides in.

The driving element 2 comprises a plurality of neodymium discs 5, with axial magnetisation, positioned alongside one another with polar expansions at the ends, appropriately sized based on the magnetic forces to be conveyed to the driven element.

One example of the arrangement of the discs and of the polar expansions is as follows: PNSNSNSNSP, where P=polar expansion, N=north, S=south.

The driven element 4 comprises a series of cylindrical magnets 6, positioned radially in relation to a longitudinal centreline of the driven element 4.

The radial cylindrical magnets 6 are positioned so as to obtain the maximum coupling of the opposite magnetic forces.

In the case in point, to considerably increase the driving force, as needed, the radial cylindrical magnets 6 are positioned in two crowns and inserted in a support block 7, preferably in nylon and C-shaped, and positioned at a defined distance from the tubular element 3.

The cylindrical magnets 6 are preferably encapsulated, on the outer half, in an iron "cup", of a thickness of 1 mm, and with a thread for its attachment to the bottom.

The driven element 4 is composed of one or more support blocks 7 joined to each other by carriages 8, preferably jointed, to facilitate the movement of the driven element 4 along the curved sections of the guide 3.

The driving element 2 also is composed of one or more groups of discs 5 joined to each other by carriages 9, preferably jointed, to facilitate the movement of the driving element 2 along the curved sections of the guide 3.

The driving element 2 has in addition a coupling element 20 for the connection of a cable, not visible in the drawings, or other drive element associated to a winch or the like.

The drive device 1 may in addition be provided with magnetised cylinder trunks, in neodymium, inserted in the driving element 2 and in the driven element 4, in a diametrical, radial and multi-pole manner so as to improve the available drive force.

In the magnetic drive device 1 according to the present invention, driving without direct contact is achieved, based on the loads to be moved and thanks to a traction force, to the speed of translation and to the acceleration/stop braking, with the use of magnetic packets outside and inside the guide and support tube 3.

The arrangement and the type of magnetic packets used in the driving element and in the driven element may be of variable dimensions as needed, and of different types.

FIGS. 6-13 show some embodiments of the magnetisation configurations which may be used.

Figure 6:
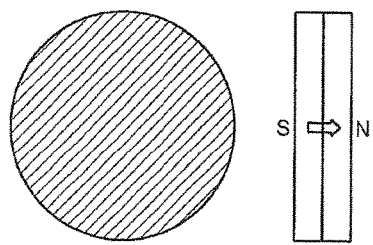
FIG. 6 illustrates schematically an example of an axial magnetisation system, applicable to the device.

FIG. 6 illustrates an example of an axial magnetisation system.

Figure 7:
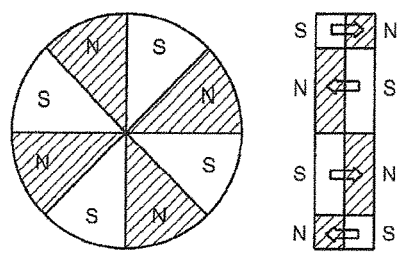
FIG. 7 illustrates schematically an example of an axial magnetisation system with alternate sectors and poles, applicable to the device.

FIG. 7 illustrates an example of an axial magnetisation system with alternate sectors and poles.

Figure 8:
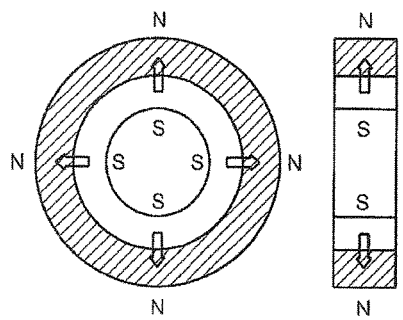
FIG. 8 illustrates schematically an example of a radial magnetisation system, applicable to the device.

FIG. 8 illustrates an example of a radial magnetization system.

Figure 9:
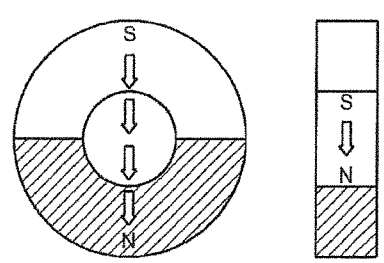
FIG. 9 illustrates schematically an example of a diametrical magnetisation system, applicable to the device.

FIG. 9 illustrates an example of a diametrical magnetisation system.

Figure 10:
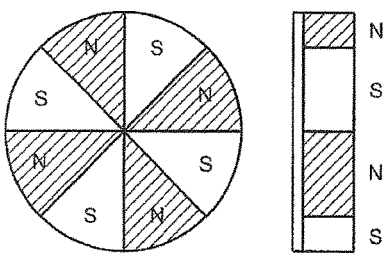
FIG. 10 illustrates schematically an example of a magnetisation system with alternate sectors on one side, applicable to the device.

FIG. 10 illustrates an example of a magnetisation system with alternate sectors on one side.

Figure 11:
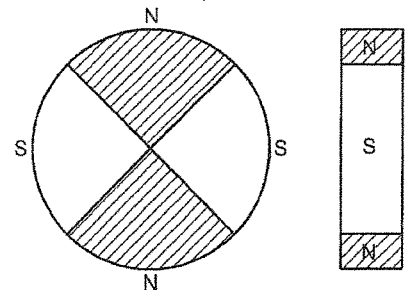
FIG. 11 illustrates schematically an example of a multipole magnetisation system on the outer diameter, applicable to the device.

FIG. 11 illustrates an example of a multi-pole magnetisation system on the outer diameter.

Figure 12:
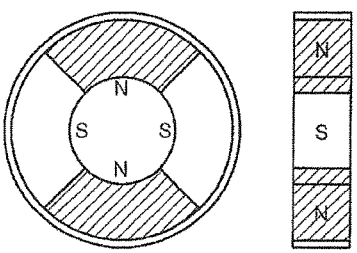
FIG. 12 illustrates schematically an example of a multipole magnetisation system on the inner diameter, applicable to the device.

FIG. 12 illustrates an example of a multi-pole magnetisation system on the inner diameter.

Figure 13:
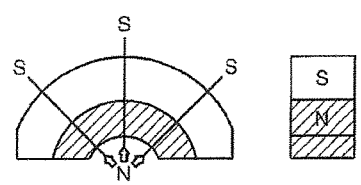
FIG. 13 illustrates schematically an example of a radial magnetisation system, applicable to the device.

FIG. 13 illustrates an example of a radial magnetisation system.

Figure 14:
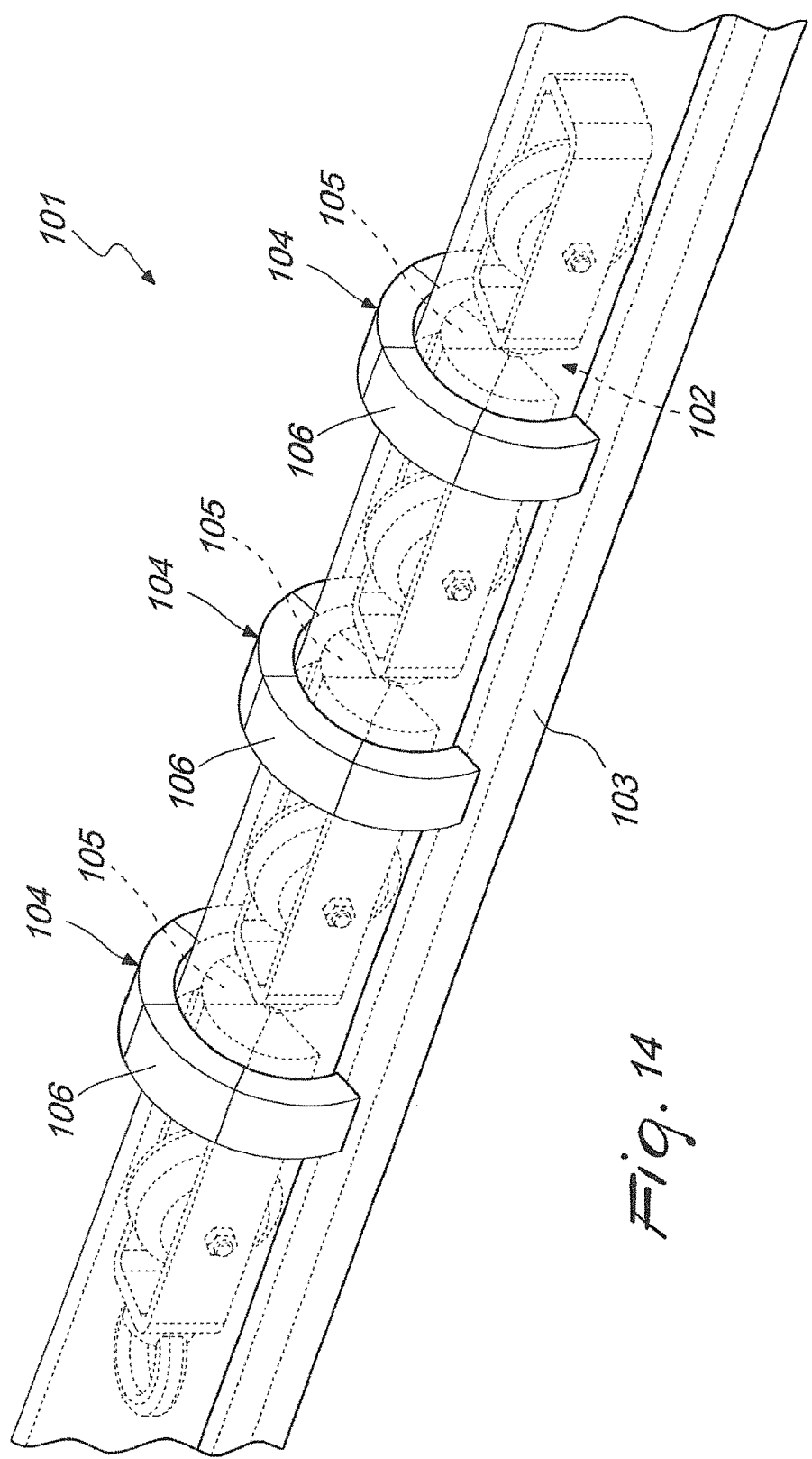
FIG. 14 is a perspective view of a further example of the magnetic drive device, according to the present invention.
Figure 15:
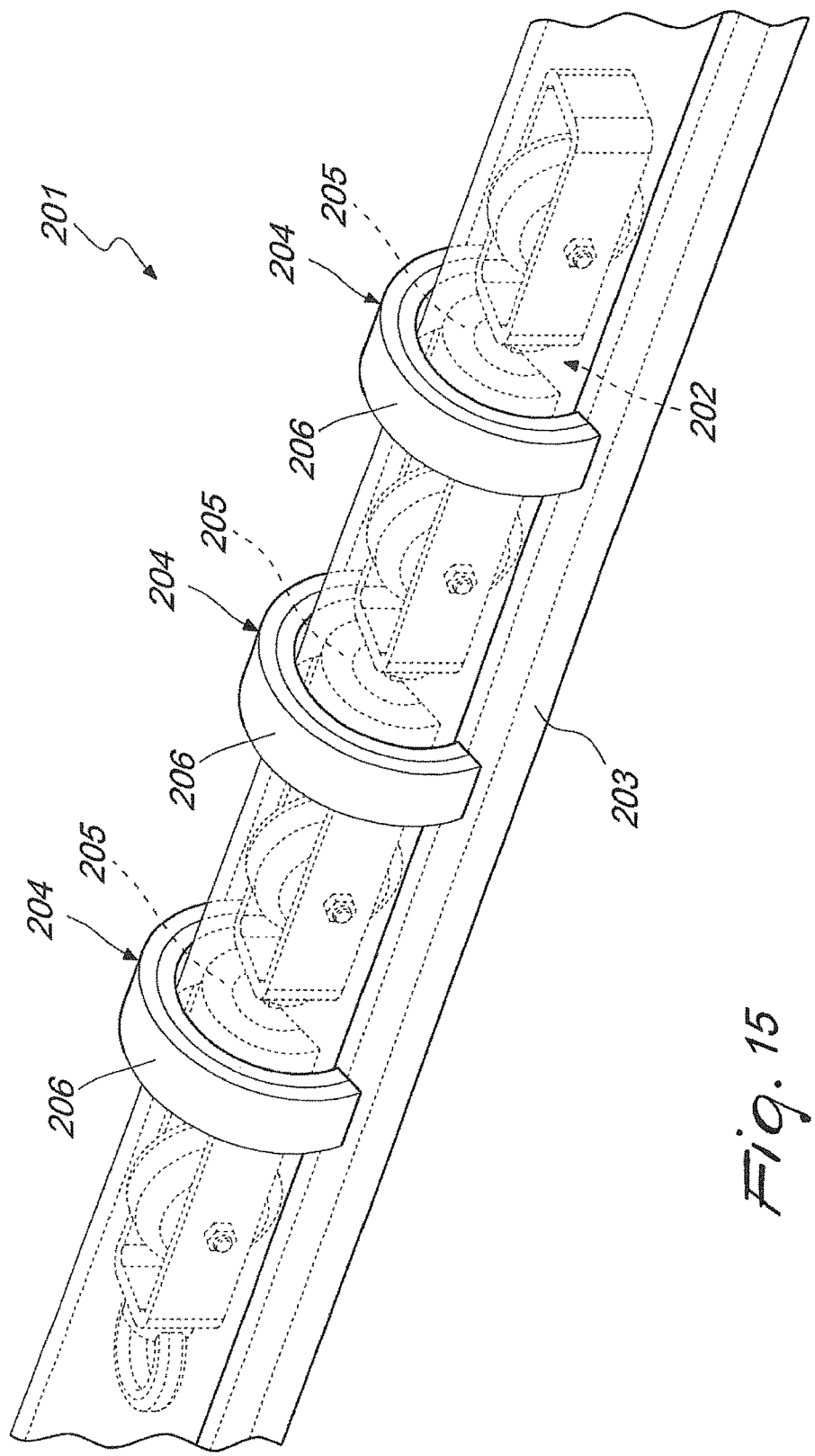
FIG. 15 is a perspective view of yet a further embodiment of the magnetic drive device, according to the present invention.

FIGS. 14 and 15 illustrate further embodiments of the device with different magnet arrangements.

FIG. 14 shows a further embodiment of the device according to the invention, globally denoted by reference numeral 101, which comprises a driving element 102 moving in a guide element 103 and suitable to drive a driven element 104, which is mobile along said guide 103 in accordance with the driving element 102.

The driving element 102 comprises a plurality of multi-pole rings 105, divided into alternate north-south pole radial sectors, with diametrical magnetisation.

The driven element 104 comprises a series of multi-pole annular magnets 106, divided into alternate north-south pole radial sectors, and positioned radially in relation to a longitudinal centreline of said driven element 104.

The multi-pole annular magnets 106 have diametrical magnetisation and are positioned so as to obtain the maximum coupling of the opposite magnetic forces.

FIG. 15 shows a further embodiment of the device according to the invention, globally denoted by reference numeral 201, which comprises a driving element 202 moving in a guide element 203, and suitable to drive a driven element 204, which is mobile along said guide 203 in accordance with the driving element 202.

The driving element 202 comprises a plurality of rings 205, consisting of a perforated cylinder at the centre, with radial, possibly multi-pole, magnetisation.

The driven element 204 comprises a series of annular magnets 206, each of which is composed of a discontinuous ring, with radial magnetisation, positioned over the drive element 202.

The multi-pole annular magnets 206 are positioned so as to obtain the maximum coupling of the opposite magnetic forces.

The examples in FIGS. 14 and 15 show merely some of the numerous possible arrangements of the magnetic elements.

Figure 16:
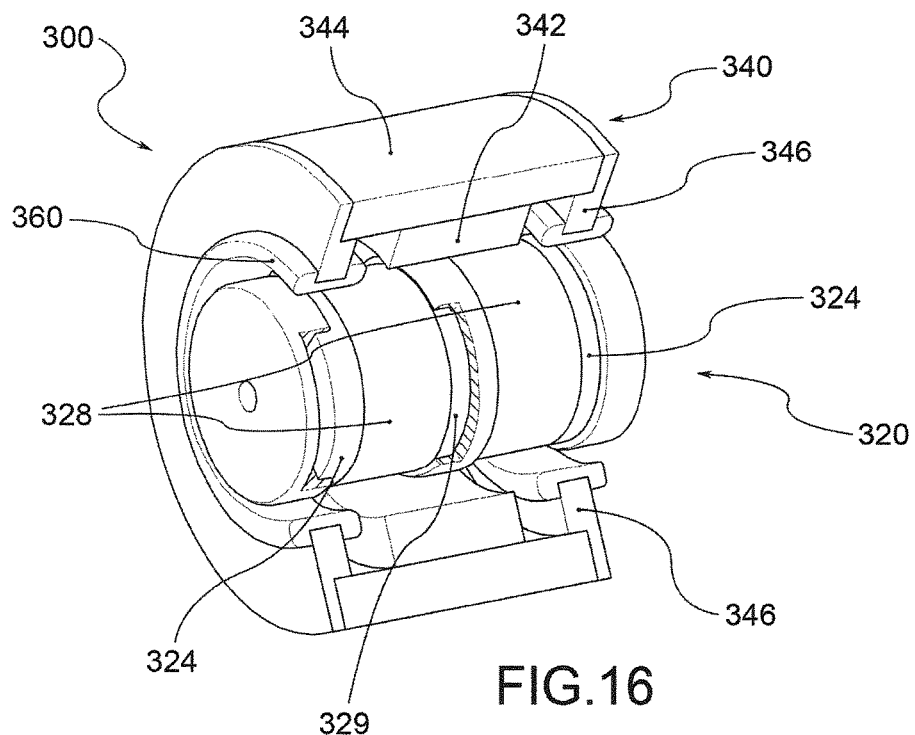
FIG. 16 is a cross-section of a further embodiment of a magnetic drive device.
Figure 17:
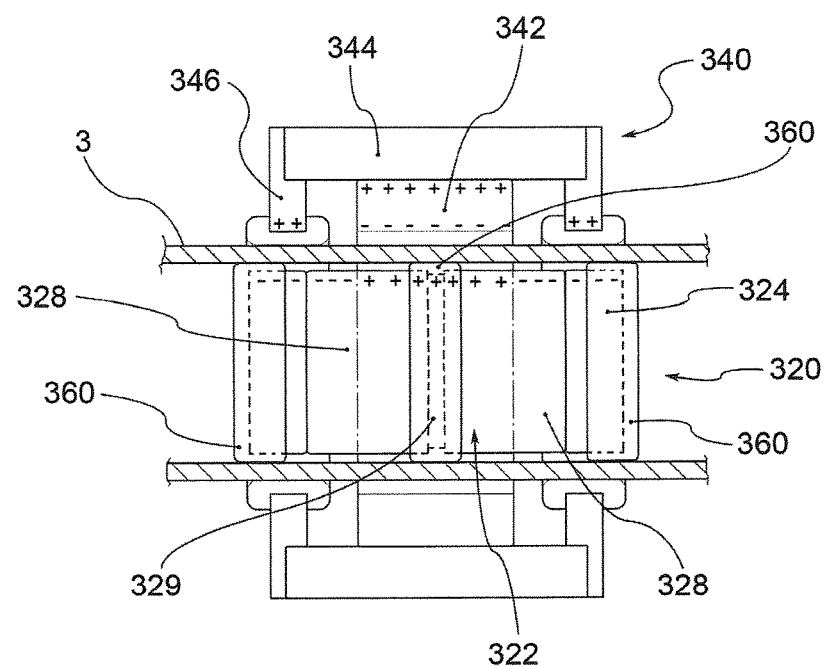
FIG. 17 is a view in partial axial cross-section of the magnetic drive device of FIG. 16.

FIGS. 16-17 illustrate a further embodiment of the device, globally denoted by reference numeral 300.

In this embodiment, the inner magnetic element, moving inside the tubular guide element 3, comprises at least one inner magnetic group 320 coaxial to said tubular guide element 3 and having a cylindrical structure. Such inner magnetic group 320 comprises at least one central magnetic element 322 and two end polar expansions 324. The central magnetic element 322 has a substantially radial magnetisation, that is has a first polarity at least on an outer annular portion thereof. The end polar expansions 324 have a second polarity, opposite the first, at least on an outer annular portion thereof. In other words, the inner magnetic group 320 is, in relation to the longitudinal axis, a three-pole group of the South-North-South or North-South-North type.

The outer magnetic element, moving outside the tubular guide element 3, comprises at least one outer magnetic group 340 of a substantially annular shape, coaxial to the inner magnetic group 320.

Said outer magnetic group 340 comprises an annular magnetic element 342 and a cylindrical polar expansion 344. The annular magnetic element 342 surrounds the central magnetic element 322; the cylindrical polar expansion 344 surrounds said annular magnetic element 342 and ends with end flanges 346 which surround said end polar expansions 324. The annular magnetic element 342 is radially magnetised and has a second polarity on an inner annular portion thereof. The end flanges 346 have said first polarity, at least on an annular portion thereof facing towards the end polar expansions 324.

In other words, the annular magnetic element 342 has an axial extension substantially equal to that of the central magnetic element 322 and is radially magnetised so as to generate between said central magnetic element 322 and the annular magnetic element 342 a magnetic field with mainly radial lines of force which tend to radially attract the two elements.

The cylindrical polar expansion 344, upon contact with the outer surface of the annular magnetic element 342, has a greater axial extension than the annular magnetic element 342, so that the end flanges 346, facing radially inwards are axially distanced from the side wells of the annular magnetic element 342. This way, the polarisation of said end flanges 346 is opposite that of the inner surface of the annular element 342, and is opposite that of the end polar expansions 324.

Thanks to the configuration and to the magnetisation of the inner 320 and outer 340 magnetic groups and to the circular cross-section of the guide element 3, the inner magnetic group 320 proves practically "suspended" namely balanced by forces, inside the tubular guide element 3. In other words, the axial symmetry of the magnetic field between the two magnetic groups makes the radial components of the lines of force annul each other.

This way, the contact and rubbing friction of the two magnetic groups with the tubular guide element is minimal, to the benefit of the drive efficiency.

The inner and outer polar expansions 324-344 mainly perform the function of flow conveyors of the magnetic field. In fact, the lines of force of the magnetic fields generated by the inner and outer magnetic groups which are not radially directed and which would therefore be lost, are "captured" by the polar expansions and also directed in a radial direction. The concatenation of the lines of force between the two magnetic groups is thus maximised by the polar expansions, so that the flow of magnetic field dispersed in the environment and thus non-utilisable is reduced to a minimum. This also contributes to increasing the drive efficiency.

It is to be noted that, an annular magnetic element 342 need not necessarily be understood as a magnetic element consisting of a single permanent magnet of an annular shape. For construction purposes in fact it could be much simpler to make a radially magnetised annular magnetic element by assembling several magnets having the shape of a sector of circular crown together, each magnet being magnetised in such a way that, when assembled with others, a substantially radial magnetisation of the entire assembly is generated. The assembly of such magnets in sectors is made possible by the presence of the cylindrical polar expansion, which in practice acts as a container for such magnets and thus as a reaction element against their tendency to move away from each other radially.

A similar consideration may be made for the central inner magnet element 322. In this case, it may prove complicated not only to make a single radially magnetised cylindrical magnet, but even to assemble several magnets in sectors as in the realisation of the outer annular magnetic element. In fact, in this case, the magnets in sectors would not be constrained by a container which contains them.

To such purpose, one possible embodiment provides for obtaining the central magnetic element 322 by using at least two identical, axially magnetised permanent cylindrical magnets 328 and an intermediate cylindrical polar expansion 329 placed between one permanent magnet and the other said permanent cylindrical magnets 328 being oriented with the adjacent poles of the same sign. This way, a concentration of poles is formed at least on a main central portion of the intermediate polar expansion 329 which has the same sign of polarity as the adjacent portions of the magnets 328 between which the polar expansion 329 is inserted. Consequently, in this case, the central magnetic element 322 is formed substantially of the two overlooking halves of the axial magnetisation magnets 328 and of the intermediate polar expansion 329.

Considering in an approximate manner the median line of each inner cylindrical magnet 328 as the demarcation line between the two poles of the magnet, the annular magnetic element 342 has an axial extension substantially equal to the distance between the median lines of the inner cylindrical permanent magnets 328.

FIG. 17 shows an example of distribution of the poles (+ and −) on the outer annular portions of the inner 320 and outer magnetic groups 340.

Figure 18:
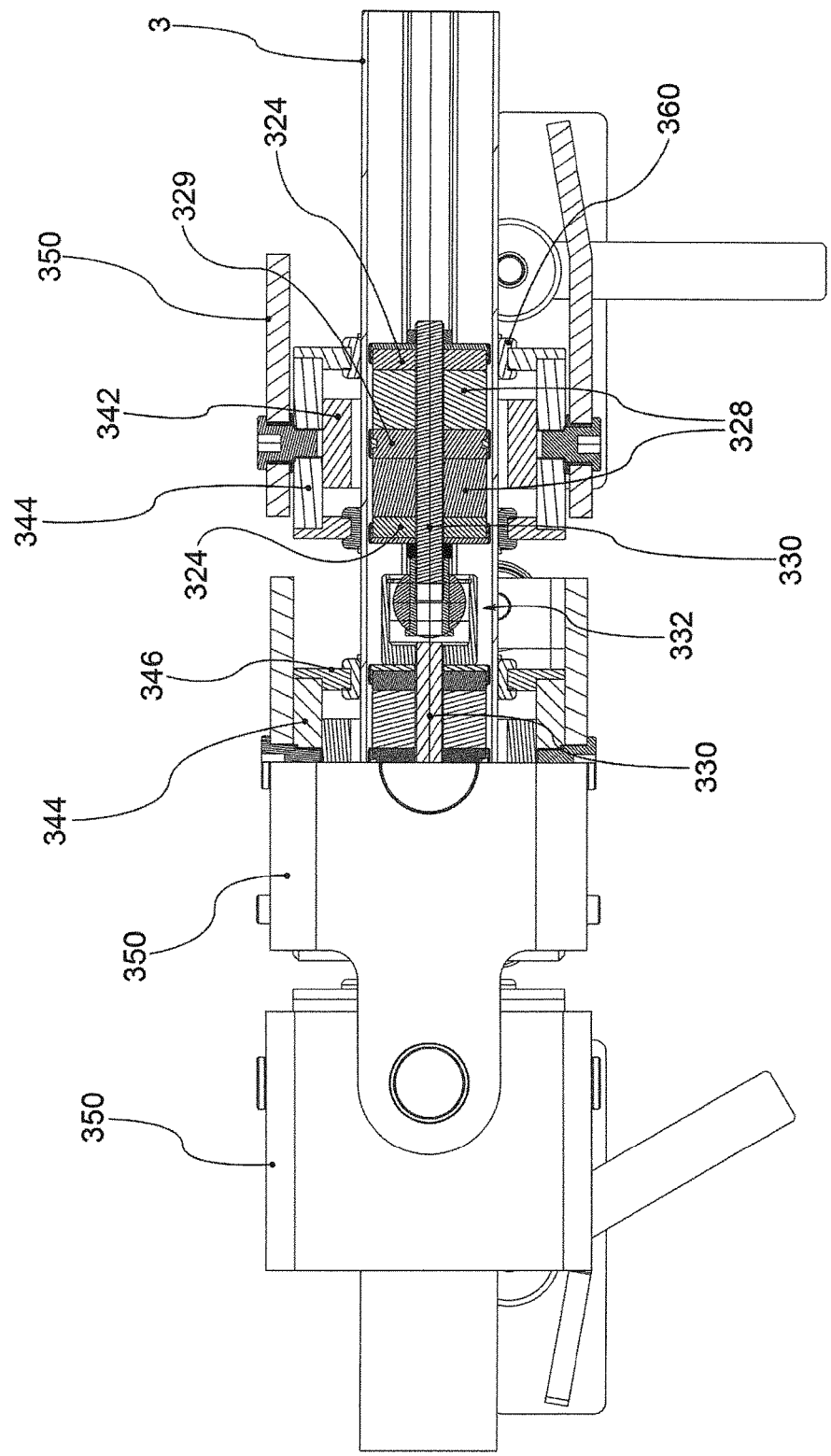
FIG. 18 is a view from above, in partial axial cross-section, of the drive device in FIGS. 16 and 17, comprising three magnetic groups connected to each other.

In one embodiment, the central magnetic element 322 and the end polar expansions 324 are axially connected to each other by means of a threaded bar 330 (see FIG. 18).

FIG. 18 shows an example of a possible embodiment of the drive device, wherein the inner and outer magnetic elements comprise several inner 320 and outer 340 magnetic groups connected to each other. To permit such driving element to also move along curved sections, the inner magnetic groups are connected to each other by means of spherical joints 332, for example connected to the ends of the threaded bars 330, or axial joints.

In one embodiment, the outer magnetic groups 340 are connected to each other by means of jointed carriages 350, that is, articulated to each other. Each carriage is attached, for example by screws, to the cylindrical polar expansion 344 of the respective outer magnetic group 340 and is suitable to support a load to be moved.

To improve the sliding of the inner and outer magnetic groups on the respective surfaces of the tubular guide element, at least the end polar expansions 324 and the inner surfaces of the end flanges 346 are covered with respective sliding rings 360 with a low friction coefficient.

In one embodiment, the tubular guide element 3 has an outer radial coupling appendage 3a to a support element. In this case, the outer magnetic group 340 is not perfectly closed but has an interruption at such radial appendage 3a.

Figure 19:
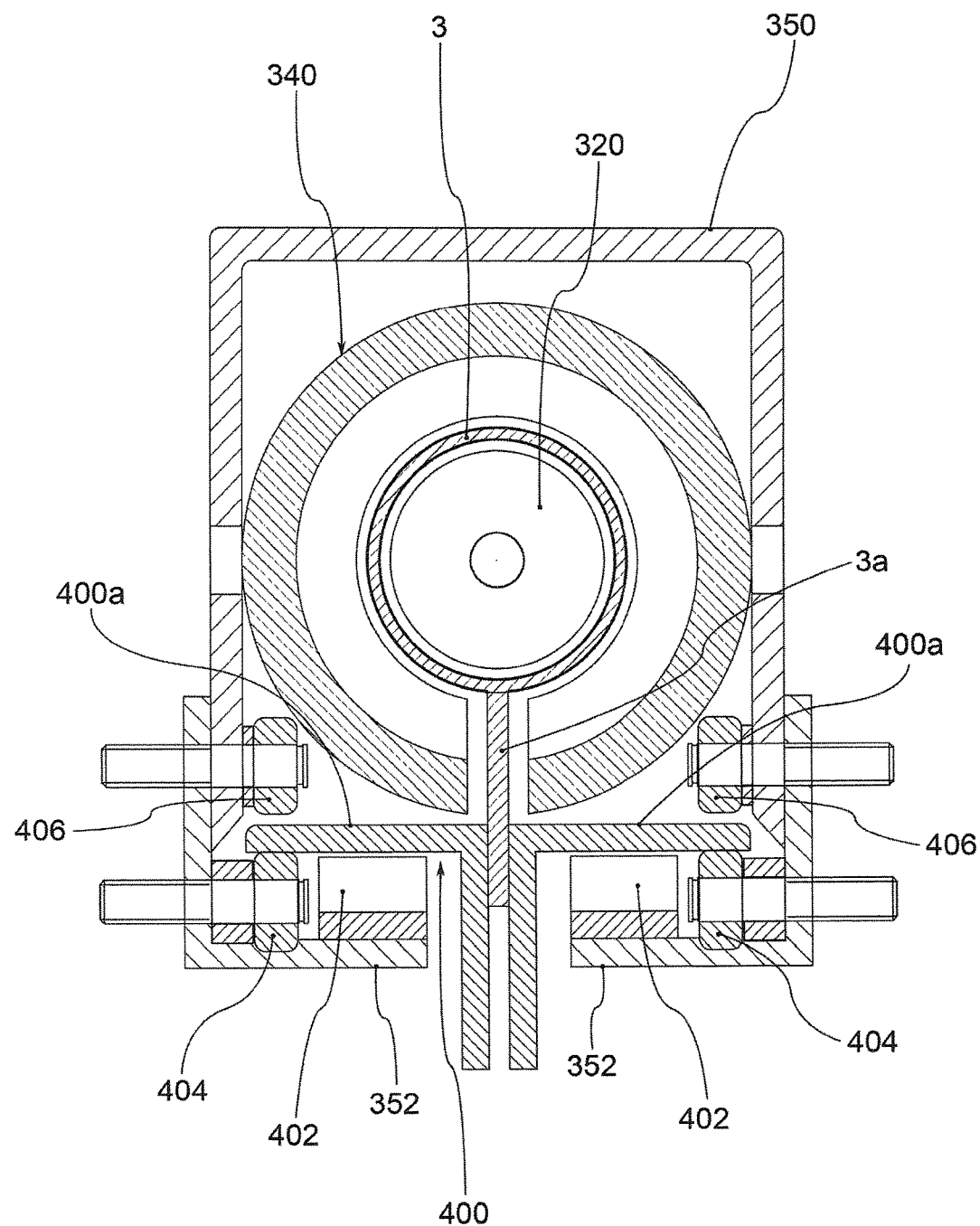
FIG. 19 is a transversal cross-section of the drive device in a further embodiment.

In a particularly advantageous embodiment shown in FIG. 19, the drive device comprises a horizontal sliding bracket 400 made of ferromagnetic material and extending externally and parallel to the tubular guide element 3. The outer magnetic group 340 is configured so as to slide by magnetic levitation along said sliding bracket 400.

In particular the outer magnetic group is provided with at least one levitation magnet 402 facing the lower side of the sliding bracket 400 and at least one spacer wheel 404 suitable to engage said lower side so as to keep said levitation magnet 402 detached from said lower side.

In a practical embodiment, the sliding bracket 400 is made by the coupling, for example by means of screws, of two sliding brackets 400a, for example L-shaped, to the opposite walls of the radial appendage 3a of the tubular guide element 3. The carriage 350 of each outer magnetic group 340 is an over turned "U" shape and is fitted with end plates 352 which each extend below a corresponding sliding bracket 400a. Each of said end plates supports a levitation magnet 402. The opposite side walls of the carriage each support a respective spacer wheel 404.

In an advantageous embodiment, the opposite side walls of the carriage 350 each support a further respective sliding wheel 406 suitable to slide on the upper side of the sliding bracket 400a if the load weighing on the carriage exceeds the force of magnetic attraction exercised by the levitation magnets 402. In this case, the levitation magnets 402, opposing the force of gravity of the carriage with the relative load, in any case perform the function of reducing the drive friction.

In one embodiment variant, the carriages 350 can slide on the tubular guide element 3 by means of sliding rollers, for example counter-shaped to the outer surface of the guide element.

As said above, the magnetic means may consist of permanent magnets and/or electromagnets.

For example, in an embodiment with electromagnets, the driving element is powered by conductors inserted in the drive cable, so that the driving is achieved by means of the electromagnetic forces induced on the driven element, which is made in ferromagnetic material It has been ascertained in practice how the invention achieves the task and purposes set out having made a drive device which makes it possible to avoid the use of systems suitable to move objects by means of the direct coupling of mechanical means, such as rack and pinion and chains.

The device according to the present invention uses the magnetic power of attraction of elements such as the neodymium and other rare-earth elements (permanent magnets) to make movement systems free of direct contact.

The possible applications of the drive device according to the present invention are multiple, in general in the field of mechanics, electricity production, chemical and others, where there is a requirement to move objects, materials and persons without direct contact between the driver and driven element.

Figure 2:
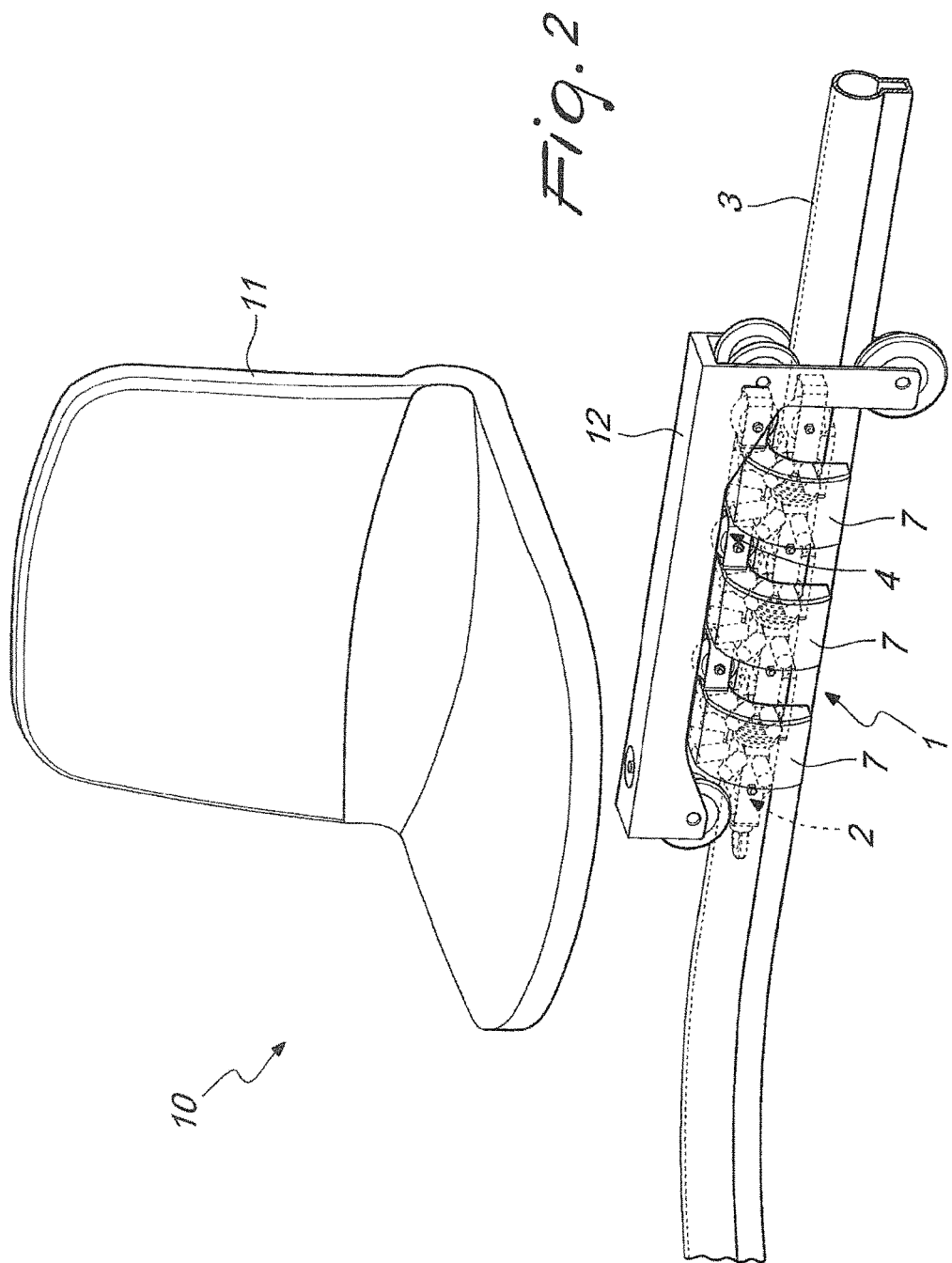
FIG. 2 is a partially exploded perspective view, showing the drive device applied to a chair lift.
Figure 3:
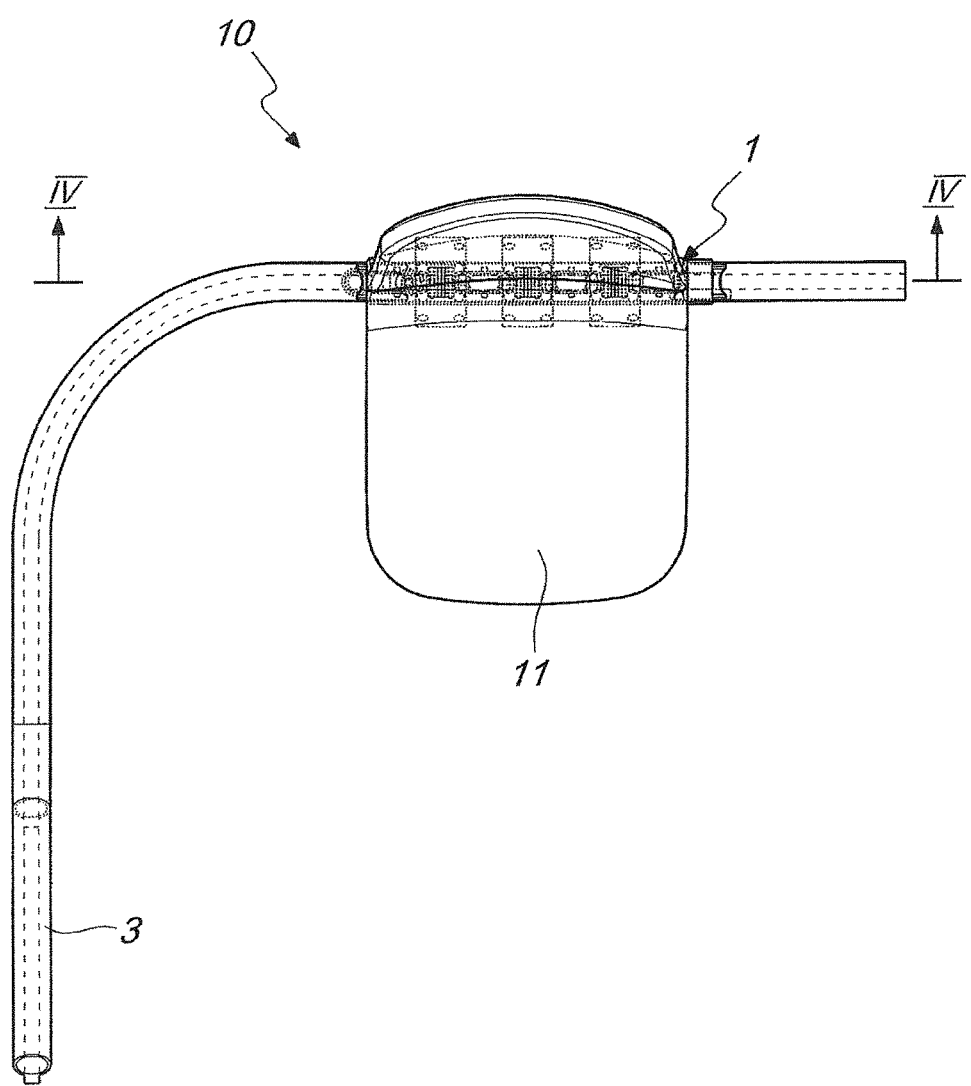
FIG. 3 is a ground view, in partial cross-section, of the chair-lift.
Figure 4:
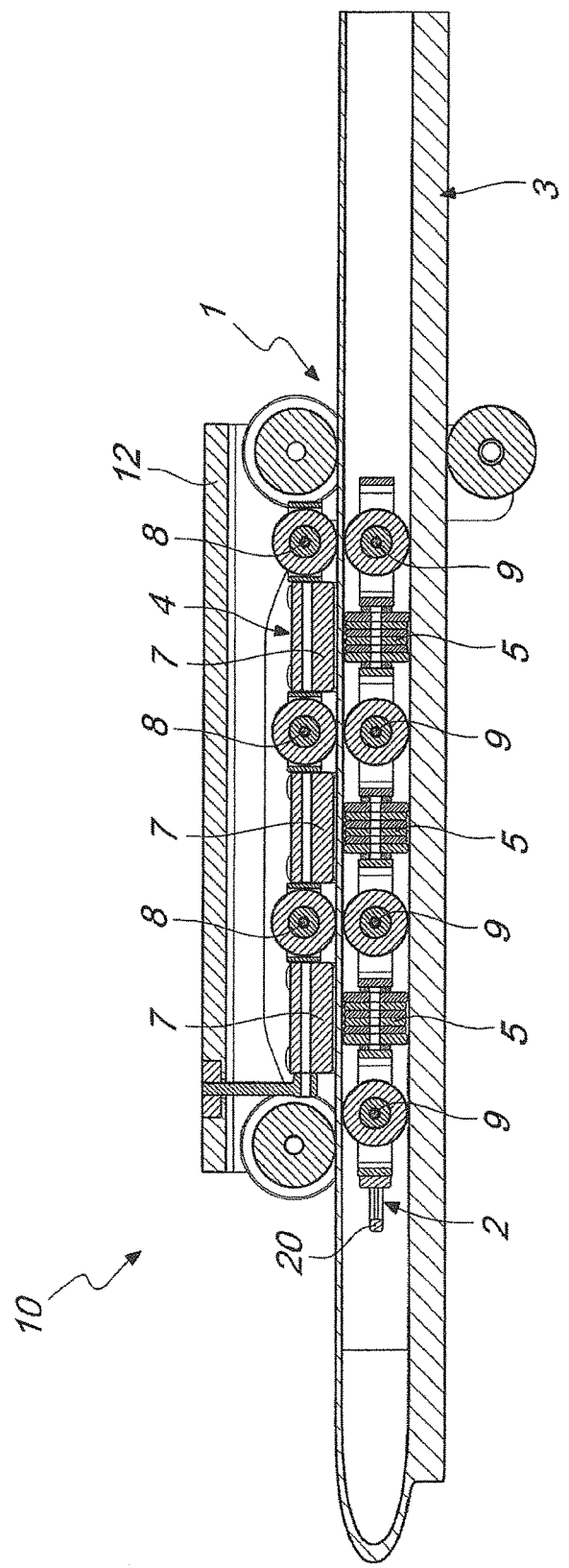
FIG. 4 is a side elevation view, longitudinally cross-sectioned, of the drive device.
Figure 5:
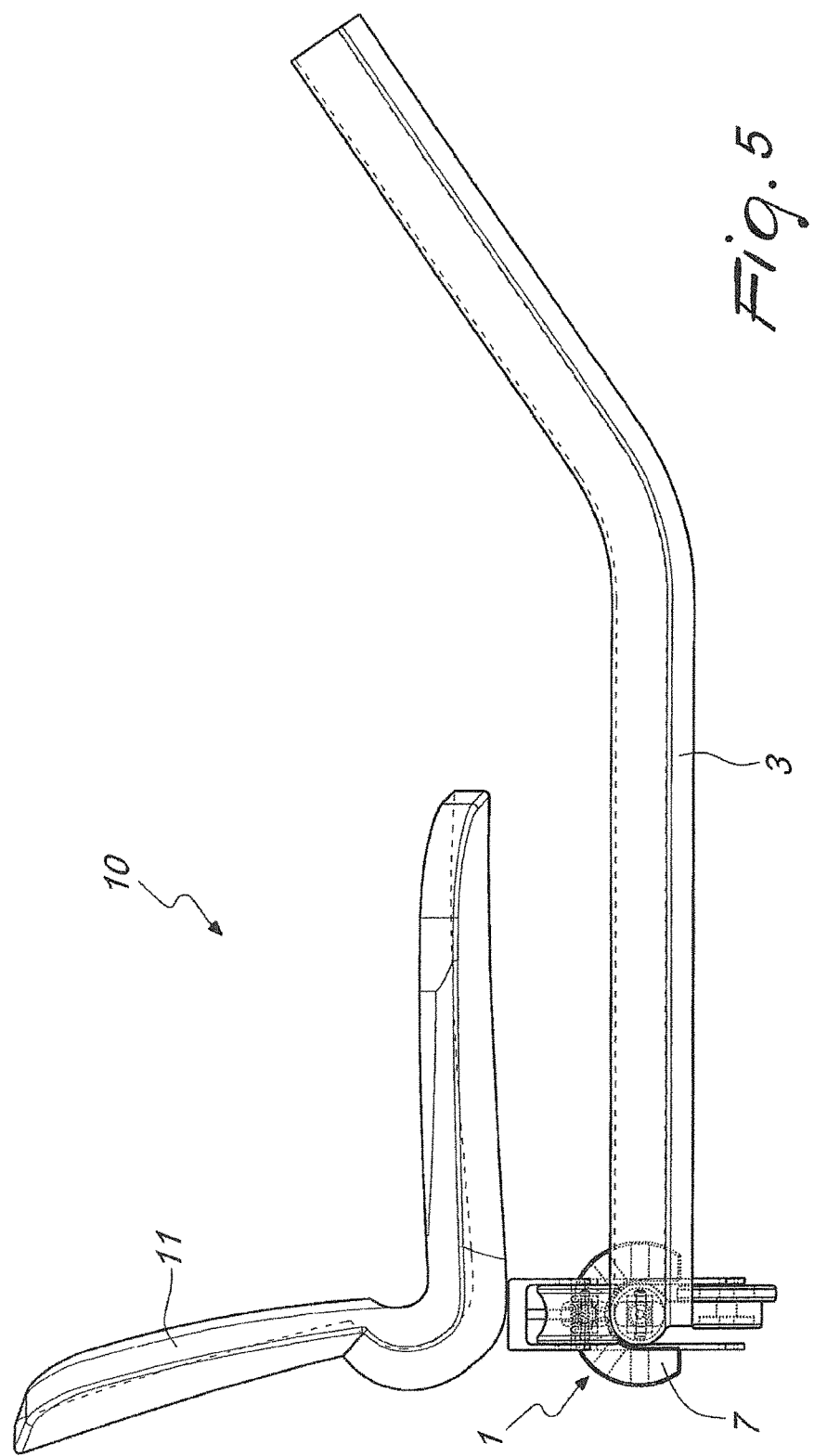
FIG. 5 is a front elevation view, transversally cross-sectioned, of the device applied to the chair-lift.

In the embodiment, described with reference to FIGS. 2, 3 and 5, the device is applied to the field of stair lifts, such as chair lifts and the like, and permits the movement of the stair lift ascent/descent system, radically simplifying the movement in that the drive element placed inside the weight-bearing tubular element moves the driven element, namely the "chair" by means of a simple winch. This mechanism, in ascent, works by traction while in descent, the chair moves by gravity, safely retained by said winch.

The present device makes it possible to make an aesthetically superior and lightweight device with advantageous costs.

Figure 20:
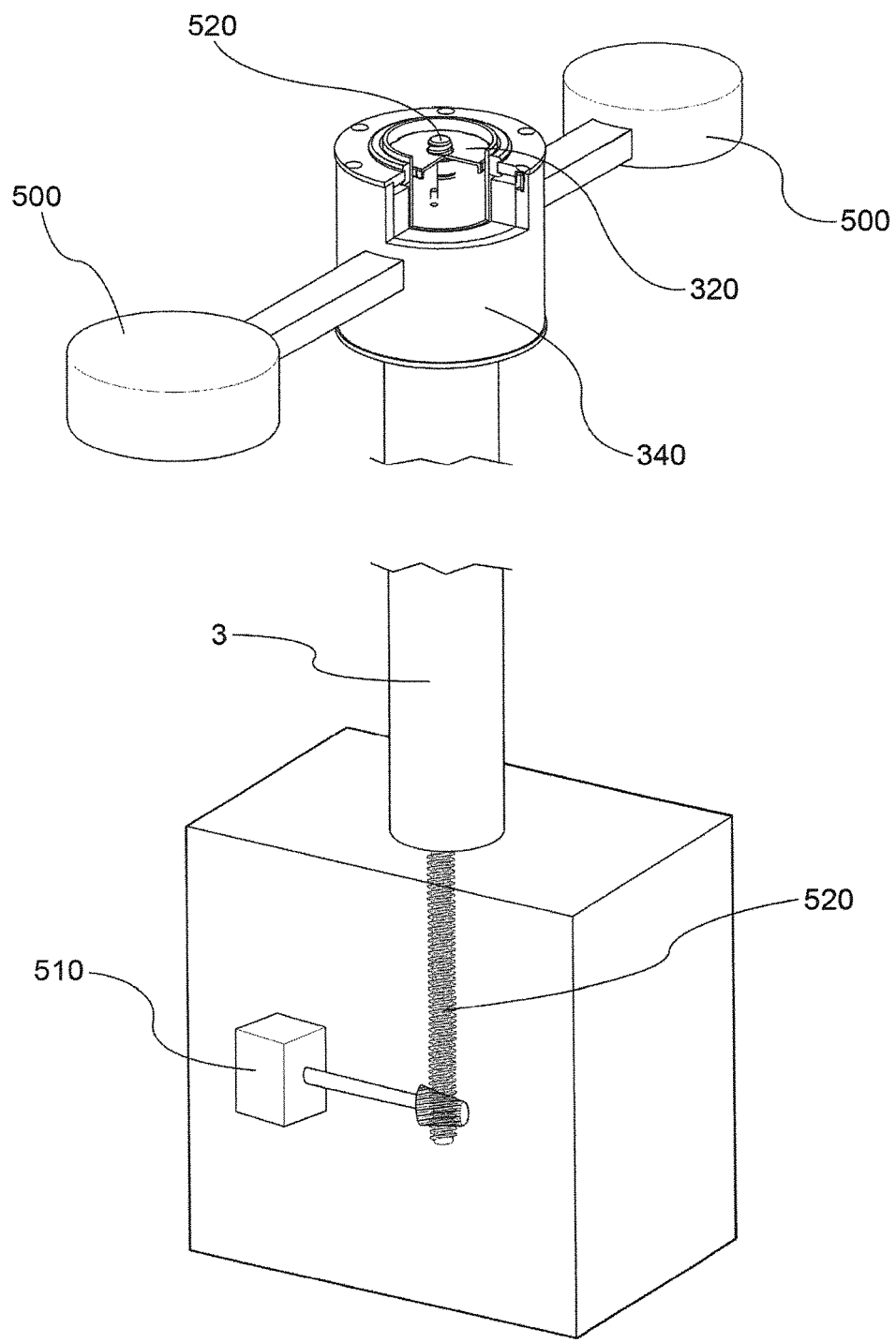
FIG. 20 shows, in a schematic form, an application of the drive device in an apparatus for generation of electricity.

FIG. 20 schematically illustrates a possible further application of the drive device. The device is used here in an electricity generator which exploits the kinetic energy of waves.

In this case, the tubular guide element 3 is installed in the sea in a vertical position. One of more floats 500 are connected to the outer magnetic group 340. The outer magnetic group 340, which in this case is the driving element, drives the inner magnetic group, which in this case is the driven element, following the movement of the waves 320. Conversion means suitable to transform the reciprocating rectilinear movement of the inner magnetic group 320 into a rotatory movement suitable for example to power a dynamo 510 are associated to the inner magnetic group 320.

For example, the inner magnetic group supports a ball hearing cage which slides along a ball bearing screw 520. The translation of the inner magnetic group 320 thus causes the rotation of the screws 520, which in turn operates the dynamo 510.

The inner magnetic group, inserted inside the tubular guide element, is advantageously protected from the sea water and from other external agents which could jeopardise its functioning over time.

It is clear that the same principle may be used to exploit other forms of energy produced by renewable sources, for example wind energy connecting the outer magnetic group 340 to a system of sails which permits such outer magnetic group 340 to be moved along the tubular guide element under the action of the wind.

The device according to the invention is susceptible to numerous modifications and variations, all falling within the same inventive concept; moreover, all the parts may be replaced with technically equivalent elements.

Naturally, the materials used, as well as the dimensions, may be varied as needed and depending on the state of the art.

The invention claimed is:

1. Magnetic drive device, comprising:
   a tubular guide element with a substantially circular cross-section,
   a driving element and a driven element, one of said driving element and driven element being an inner element, moving in said tubular guide element, the other of said driving element and said driven element being an outer element, moving externally to said tubular guide element, the driven element being mobile in accordance with the movement of said driving element, said driving element acting on said driven element by means of magnetic means and without direct physical contact,
   wherein the inner element comprises at least one inner magnetic group coaxial to the tubular guide element and of a substantially cylindrical shape, and wherein the outer element comprises at least one outer magnetic group of an annular shape coaxial to the inner magnetic group,
   wherein said inner magnetic group comprises at least one central magnetic element and two end polar expansions, wherein said at least one central magnetic element has a first polarity at least on an outer annular portion thereof, and wherein said end polar expansions have a second polarity, opposite the first polarity, at least on an outer annular portion thereof, and wherein said outer magnetic group comprises an annular magnetic element which surrounds said at least one central magnetic element and a cylindrical polar expansion which surrounds said annular magnetic element and end flanges which surround said end polar expansions, wherein the annular magnetic element is radially magnetized and has said second polarity on an inner annular portion thereof, and wherein said end flanges have said first polarity, at least on an annular portion thereof facing towards the end polar expansions.

2. Device according to claim 1, wherein the at least one central magnetic element comprises at least two identical, axially magnetized permanent cylindrical magnets and an intermediate cylindrical polar expansion placed between one permanent magnet and the other, said permanent cylindrical magnets being directed with the adjacent poles of the same sign.

3. Device according to claim 2, wherein the annular magnetic element has an axial extension substantially equal to the distance between the median lines of the cylindrical permanent magnets of the at least one central magnetic element.

4. Device according to claim 1, wherein the at least one central magnetic element and the end polar expansions are axially connected to each other by means of a threaded bar.

5. Device according to claim 1, wherein said at least one central magnetic element comprises at least one radially magnetized magnet.

6. Device according to claim 1, wherein several inner magnetic groups are connected to each other by mean of spherical or axial joints.

7. Device according to claim 1, wherein several outer magnetic groups are connected to each other by mean of jointed carriages, each carriage being attached to the cylindrical polar expansion of the respective outer magnetic group.

8. Device according to claim 1, wherein at least the end polar expansions and inner surfaces of the end flanges are covered with respective sliding rings, suitable to slide on the inner and outer surfaces, respectively, of the tubular guide element.

9. Device according to claim 1, further comprises magnetized cylindrical trunks, inserted in said driving element and in said driven element, in one of a diametrical, radial or multi-pole manner.

10. Device according to claim 1, wherein said driven element comprises a plurality of disc-shaped permanent magnets, with axial magnetization, positioned alongside one another, with polar expansions at the ends, or in the shape of a cylinder or portions of cylinder with radial magnetization.

11. Device according to claim 1, wherein said magnetic means comprise electromagnets; said driven element being powered by conductors inserted in a drive element associated to said driving element; said driven element being made of ferromagnetic material;
the driving being achieved by means of electromagnetic forces induced on said driven element.

12. Device according to claim 1, wherein the tubular guide element has an outer radial coupling appendage suitable for coupling to a support element.

13. Device according to claim 1, comprising a horizontal sliding bracket made of ferromagnetic material and extending externally and parallel to the tubular guide element, the outer element sliding by magnetic levitation along said sliding bracket.

14. Device according to claim 13, wherein the outer element is provided with at least one levitation magnet facing the lower side of the sliding bracket and at least one spacer wheel suitable to engage said lower side so as to keep said levitation magnet detached from said lower side.

15. Device according to claim 14, wherein the outer element is further provided with at least one sliding wheel suitable to slide on the upper side of the horizontal sliding bracket if the load weighing on the outer element exceeds the force of magnetic attraction exercised by the levitation magnet.

16. Device according to claim 1, wherein the driving element is the inner element and comprises a coupling element for the connection of an associated drive element to a winch.

17. Electricity generator suitable for exploiting energy produced by a renewable source, comprising:

a magnetic drive device comprising:
 a tubular guide element with a substantially circular cross-section,
 a driving element and a driven element, one of said driving element and driven element being an inner element, moving in said tubular guide element, the other of said driving element and said driven element being an outer element, moving externally to said tubular guide element, the driven element being mobile in accordance with the movement of said driving element, said driving element acting on said driven element by means of magnetic means and without direct physical contact,
 wherein the inner element comprises at least one inner magnetic group coaxial to the tubular guide element and of a substantially cylindrical shape, and wherein the outer element comprises at least one outer magnetic group of an annular shape coaxial to the inner magnetic group,
 wherein said inner magnetic group comprises at least one central magnetic element and two end polar expansions, wherein said at least one central magnetic element has a first polarity at least on an outer annular portion thereof, and wherein said end polar expansions have a second polarity, opposite the first polarity, at least on an outer annular portion thereof, and wherein said outer magnetic group comprises an annular magnetic element which surrounds said at least one central magnetic element and a cylindrical polar expansion which surrounds said annular magnetic element and end flanges which surround said end polar expansions, wherein the annular magnetic element is radially magnetized and has said second polarity on an inner annular portion thereof, and wherein said end flanges have said first polarity, at least on an annular portion thereof facing towards the end polar expansions;
movement means integral with the outer magnetic element and suitable to be moved by the energy produced by the renewable source, to cause a movement of the outer magnetic element along the tubular guide element.

18. Generator according to claim 17, wherein the inner magnetic group supports a ball bearing cage suitable to slide along a ball bearing screw, in such a way that the translation of the inner magnetic group causes the rotation of said screw.

19. Generator according to claim 17, wherein said movement means comprise at least one float to exploit the kinetic energy of waves.

20. Generator according to claim 17, wherein said movement means comprise a system of sails to exploit wind energy.

* * * * *